United States Patent
Donahue et al.

(10) Patent No.: US 8,771,901 B2
(45) Date of Patent: Jul. 8, 2014

(54) SOFC STACK HAVING A HIGH TEMPERATURE BONDED CERAMIC INTERCONNECT AND METHOD FOR MAKING SAME

(75) Inventors: William J. Donahue, Pepperell, MA (US); Oh-Hun Kwon, Westborough, MA (US); F. Michael Mahoney, Holliston, MA (US); John D. Pietras, Sutton, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 1096 days.

(21) Appl. No.: 11/696,624

(22) Filed: Apr. 4, 2007

(65) Prior Publication Data
US 2007/0237999 A1    Oct. 11, 2007

Related U.S. Application Data

(60) Provisional application No. 60/789,619, filed on Apr. 5, 2006.

(51) Int. Cl.
*H01M 8/00* (2006.01)
*H01M 8/10* (2006.01)
*H01M 8/24* (2006.01)
*H01M 2/08* (2006.01)
*H01M 2/14* (2006.01)

(52) U.S. Cl.
USPC ............ 429/535; 429/465; 429/486; 429/507

(58) Field of Classification Search
USPC ............................. 429/32, 465, 486, 507, 535
See application file for complete search history.

(56) References Cited

U.S. PATENT DOCUMENTS

| | | | |
|---|---|---|---|
| 3,404,040 | A | 10/1968 | Mitoff et al. |
| 4,000,006 | A | 12/1976 | Trocciola et al. |
| 4,421,787 | A | 12/1983 | Ikezawa et al. |

(Continued)

FOREIGN PATENT DOCUMENTS

| | | |
|---|---|---|
| CA | 2090683 | 3/1992 |
| CA | 2620421 A1 | 3/2007 |

(Continued)

OTHER PUBLICATIONS

Aulbach, E. et al., "Laser-Assisted High-Resolution Loading Dilatometer and Applications," Experimental Mechanics, vol. 44, No. 1, 2004 Society for Experimental Mechanics, pp. 71-75.

(Continued)

*Primary Examiner* — Eli Mekhlin
(74) *Attorney, Agent, or Firm* — Robert N. Young; Abel Law Group, LLP

(57) ABSTRACT

The present disclosure is directed to an integrated SOFC stack including, a first cell having a cathode layer, an electrolyte layer overlying the cathode layer, and an anode layer overlying the electrolyte layer. The SOFC stack also includes a second cell having a cathode layer, an electrolyte layer overlying the cathode layer, and an anode overlying the electrolyte layer. The SOFC stack further includes a ceramic interconnect layer between the first cell and the second cell, the ceramic interconnect layer having a first high temperature bonding region along the interfacial region between the first cell and the ceramic interconnect layer. The ceramic interconnect layer also includes a second high temperature bonding region along the interfacial region between the second cell and the ceramic interconnect layer.

12 Claims, 2 Drawing Sheets

(56) References Cited

U.S. PATENT DOCUMENTS

| | | | |
|---|---|---|---|
| 4,505,992 A | 3/1985 | Dettling et al. | |
| 4,605,602 A | 8/1986 | Feigenbaum et al. | |
| 4,732,637 A | 3/1988 | Dettling et al. | |
| 4,749,632 A * | 6/1988 | Flandermeyer et al. | 429/468 |
| 4,799,936 A | 1/1989 | Riley | |
| 4,851,304 A | 7/1989 | Miwa et al. | |
| 4,913,982 A | 4/1990 | Kotchick et al. | |
| 4,997,726 A | 3/1991 | Akiyama et al. | |
| 5,034,288 A | 7/1991 | Bossel | |
| 5,069,987 A | 12/1991 | Gordon | |
| 5,114,803 A | 5/1992 | Ishihara et al. | |
| 5,162,167 A * | 11/1992 | Minh et al. | 429/456 |
| 5,186,877 A | 2/1993 | Watanabe | |
| 5,273,837 A | 12/1993 | Aitken et al. | |
| 5,292,599 A | 3/1994 | Soma et al. | |
| 5,486,428 A | 1/1996 | Gardner et al. | |
| 5,508,127 A | 4/1996 | Lewin et al. | |
| 5,531,019 A | 7/1996 | Taira et al. | |
| 5,551,955 A | 9/1996 | Taira et al. | |
| 5,554,454 A | 9/1996 | Gardner et al. | |
| 5,589,285 A * | 12/1996 | Cable et al. | 429/13 |
| 5,595,833 A | 1/1997 | Gardner et al. | |
| 5,601,937 A | 2/1997 | Isenberg | |
| 5,604,048 A * | 2/1997 | Nishihara et al. | 429/484 |
| 5,686,197 A | 11/1997 | Nishida et al. | |
| 5,753,385 A | 5/1998 | Jankowski et al. | |
| 5,786,105 A | 7/1998 | Matsushima et al. | |
| 5,827,620 A | 10/1998 | Kendall | |
| 5,869,201 A | 2/1999 | Marchetti | |
| 5,885,729 A | 3/1999 | Marchetti | |
| 5,902,691 A | 5/1999 | Matzkin-Bridger et al. | |
| 5,922,486 A | 7/1999 | Chiao | |
| 5,942,349 A | 8/1999 | Badwal et al. | |
| 5,993,986 A | 11/1999 | Wallin et al. | |
| 6,025,084 A | 2/2000 | Kawasaki et al. | |
| 6,051,329 A * | 4/2000 | Fasano et al. | 429/30 |
| 6,093,500 A | 7/2000 | Margiott et al. | |
| 6,099,985 A | 8/2000 | Elangovan et al. | |
| 6,117,302 A | 9/2000 | Roha | |
| 6,228,520 B1 | 5/2001 | Chiao | |
| 6,280,484 B1 | 8/2001 | Kelder et al. | |
| 6,309,769 B1 | 10/2001 | Haug | |
| 6,316,138 B1 | 11/2001 | Satake et al. | |
| 6,399,233 B1 | 6/2002 | Milliken et al. | |
| 6,428,920 B1 | 8/2002 | Badding et al. | |
| 6,436,565 B1 | 8/2002 | Song et al. | |
| 6,485,852 B1 | 11/2002 | Miller et al. | |
| 6,551,734 B1 | 4/2003 | Simpkins et al. | |
| 6,551,735 B2 | 4/2003 | Badding et al. | |
| 6,593,020 B1 | 7/2003 | Yoo et al. | |
| 6,649,296 B1 | 11/2003 | Minh | |
| 6,653,009 B2 | 11/2003 | Wang et al. | |
| 6,677,070 B2 | 1/2004 | Kearl | |
| 6,682,842 B1 | 1/2004 | Visco et al. | |
| 6,692,855 B1 | 2/2004 | Aizawa et al. | |
| 6,783,880 B2 | 8/2004 | Christiansen | |
| 6,790,474 B1 | 9/2004 | Hishinuma et al. | |
| 6,803,141 B2 | 10/2004 | Pham et al. | |
| 6,822,193 B2 | 11/2004 | Olsen et al. | |
| 6,835,485 B2 | 12/2004 | Ukai et al. | |
| 6,846,511 B2 | 1/2005 | Visco et al. | |
| 6,855,451 B2 | 2/2005 | Ghosh et al. | |
| 6,864,009 B2 | 3/2005 | Yoo et al. | |
| 6,896,989 B2 | 5/2005 | Hara et al. | |
| 6,949,307 B2 | 9/2005 | Cable et al. | |
| 7,070,879 B2 | 7/2006 | Mardilovich et al. | |
| 7,550,217 B2 | 6/2009 | Kwon et al. | |
| 2002/0142210 A1 | 10/2002 | Kaiser et al. | |
| 2002/0150805 A1 | 10/2002 | Stenersen et al. | |
| 2002/0155227 A1 | 10/2002 | Damani et al. | |
| 2002/0155335 A1 | 10/2002 | Kearl | |
| 2003/0077496 A1 | 4/2003 | Keegan et al. | |
| 2004/0091766 A1* | 5/2004 | Yoo et al. | 429/38 |
| 2004/0121217 A1 | 6/2004 | Herman et al. | |
| 2004/0183055 A1 | 9/2004 | Chartier et al. | |
| 2004/0247971 A1* | 12/2004 | Sarin et al. | 429/30 |
| 2005/0017055 A1* | 1/2005 | Kurz et al. | 228/194 |
| 2005/0019636 A1* | 1/2005 | Kwon et al. | 429/32 |
| 2005/0095479 A1 | 5/2005 | Mardilovich et al. | |
| 2006/0024547 A1 | 2/2006 | Waldbillig et al. | |
| 2006/0057295 A1 | 3/2006 | Visco et al. | |
| 2006/0153974 A1 | 7/2006 | Matsuzaki et al. | |
| 2006/0280998 A1 | 12/2006 | Ying et al. | |
| 2007/0178366 A1 | 8/2007 | Mahoney et al. | |

FOREIGN PATENT DOCUMENTS

| | | |
|---|---|---|
| DE | 4307967 A1 | 9/1994 |
| DE | 19963882 A1 | 9/2000 |
| EP | 0455418 A2 | 11/1991 |
| EP | 0466418 A1 | 1/1992 |
| EP | 0510820 A2 | 10/1992 |
| EP | 0552055 A2 | 7/1993 |
| EP | 0788175 B1 | 8/1997 |
| EP | 0809313 A2 | 11/1997 |
| EP | 1306920 A2 | 5/2003 |
| EP | 1306920 A3 | 5/2003 |
| EP | 1343215 B1 | 9/2003 |
| EP | 1624521 | 2/2006 |
| JP | 63-43263 | 2/1988 |
| JP | 10040934 A | 2/1988 |
| JP | H01502109 A | 7/1989 |
| JP | 6052863 A | 2/1994 |
| JP | 6223848 A | 8/1994 |
| JP | 6302330 A | 10/1994 |
| JP | 09045356 A | 2/1997 |
| JP | 2004200125 A | 7/2004 |
| KR | 20020069338 | 8/2002 |
| RU | 2037239 C1 | 9/1995 |
| RU | 2129323 | 4/1999 |
| RU | 2197039 | 1/2003 |
| SU | 365642 | 8/1973 |
| WO | 8803332 | 5/1988 |
| WO | 01/48855 A1 | 7/2001 |
| WO | 03034515 A | 4/2003 |
| WO | 2004/057694 A1 | 7/2004 |
| WO | 2005/027239 | 3/2005 |

OTHER PUBLICATIONS

Sarin, V., et al. "Development of Hot Pressing as a Low Cost Processing Technique for Fuel Cell Fabrication" Final Annual Progress Report, Jan. 6, 2003, U.S. Department of Energy, Office of Fossil Energy, pp. 1-44.

Chick, Larry A. et al.,"Phase Transitions and Transient Liquid-Phase Sintering in Calcium-Substituted Lanthanum Chromite", Journal of the American Ceramic Society, vol. 80, No. 8, 1997, pp. 2109-2120.

Itoh, H. et al., "Research and Development on Anode-Supported Type SOFC Stack—Preparation and Investigation of the Electricity Generation Characteristics for 3 Cell Stacks with High Power Density in All Ceramics Under 1,000° C. Operation", CRIEPI Report, W03039, 22 pages. (Article in Japanese) (Abstract in English).

Koc, R. et al., "Electrical Conductivity and Seebeck Coefficient of (La, Ca) (Cr, Co) O3", Journal of Materials Science 27, 1992 Chapman & Hall, pp. 5477-5482.

Nasrallah, M.M. et al., "Low Temperature Air-Sinterable LaCrO3 and YCrO3", Proceedings of the Second International Symposium on Solid Oxide Fuel Cells, Commission of the European Communities, Luxembourg, 1991, pp. 637-644.

Simner, Steven P. et al., "Sintering and Properties of Mixed Lanthanide Chromites", Journal of the Electrochemical Society, 2001 The Electrochemical Society, pp. A351-A360.

Mori, Masashi et al., "Sintering Behavior of Ca- or Sr-doped LaCrO3 Perovskites Including Second Phase of AECrO4 (AE=Sr, Ca) in Air", Solid State Ionics, 2000 Elsevier Science B.V., pp. 743-748.

Sarin, V., et al., "Development of Hot Pressing as a Low Cost Processing Technique for Fuel Cell Fabrication", Final Annual Technical Progress Report, Jan. 6, 2003, Dept. of Manufacturing Engineering, Boston University, 44 pgs.

(56) References Cited

OTHER PUBLICATIONS

Carter, J.D. et al., "Solubility of Calcium in Lanthanum Chromite", Solid Oxide Fuel Cells: 3rd International Symposium:183rd Meeting, 1993 The Electrochemical Society, pp. 344-353.

Korean Office Action dated Oct. 28, 2011, with regard to family member KR 10-2008-7024149 (along with an English Language translation thereof).

* cited by examiner

SOFC STACK HAVING A HIGH TEMPERATURE BONDED CERAMIC INTERCONNECT AND METHOD FOR MAKING SAME

CROSS REFERENCE TO RELATED APPLICATIONS

The present application claims priority from U.S. Provisional Patent Application No. 60/789,619, filed Apr. 5, 2006, entitled "A SOFC STACK HAVING A HIGH TEMPERATURE BONDED CERAMIC INTERCONNECT AND METHOD FOR MAKING SAME", naming inventors William J. Donahue, Oh-Hun Kwon, F. Michael Mahoney, and John D. Pietras, which application is incorporated by reference herein in its entirety.

BACKGROUND OF THE INVENTION

In pursuit of high-efficiency, environmentally friendly energy production, solid oxide fuel cell (SOFC) technologies have emerged as a potential alternative to conventional turbine and combustion engines. SOFCs are generally defined as a type of fuel cell in which the electrolyte is a solid metal oxide (generally non-porous or limited to closed porosity), in which $O^{2-}$ ions are transported from the cathode to the anode. Fuel cell technologies, and particularly SOFCs, typically have a higher efficiency and have lower CO and NOx emissions than traditional combustion engines. In addition, fuel cell technologies tend to be quiet and vibration-free. Solid oxide fuel cells have an advantage over other fuel cell varieties. For example, SOFCs can use fuel sources, such as natural gas, propane, methanol, kerosene, and diesel, among others, because SOFCs operate at sufficiently high operating temperatures to allow for internal fuel reformation. However, challenges exist in reducing the cost of SOFC systems to be competitive with combustion engines and other fuel cell technologies. These challenges include lowering the cost of materials, improving degradation or life cycle, and improving operation characteristics, such as current and power density.

Among the many challenges with the manufacture of SOFCs, the formation of free standing and fully integrated SOFC stacks parameters remains a notable engineering hurdle, particularly, SOFC stacks utilizing a series electrical connection, or SOFC stacks utilizing a variety of different materials with different processing. In this respect, prior art techniques have focused on processing individual component layers or a plurality of layers having similar processing parameters combined with a final joining process to bond all of the components to form a SOFC stack. The final joining process usually involves bonding the individual layers or cells together using a solder or glass encapsulant and entails multiple firing cycles. Often the layers and the cells are merely clamped together and held under pressure. In view of the foregoing, the industry continues to have a need for improved SOFC cells and SOFC cell stacks.

SUMMARY OF THE INVENTION

The present invention is directed to an integrated SOFC stack. The stack includes a first cell having a cathode layer, an electrolyte layer overlying the cathode layer, and an anode layer overlying the electrolyte layer. A second cell has a cathode layer, an electrolyte layer overlying the cathode layer, and an anode overlying the electrolyte layer. A ceramic interconnect layer is between the first cell and the second cell. The ceramic interconnect layer has a first high temperature bonding region along an interfacial region between the first cell and the ceramic interconnect layer, and a second high temperature bonding region along an interfacial region between the second cell and the ceramic interconnect layer.

A method for forming an integrated SOFC stack includes forming a first cell structure. The first cell structure has a first electrode layer, an electrolyte layer overlying the first electrode layer, and a second electrode layer overlying the electrolyte layer. A ceramic interconnect layer overlying the first cell structure is formed. A second cell structure is formed. The second cell structure has a first electrode layer, an electrolyte layer overlying the first electrode layer, and a second electrode layer overlying the electrolyte layer. The first cell structure, the interconnect layer, and the second cell structure are hot pressed together to integrally bond the first cell structure, the interconnect layer and the second cell structure to form an integrated SOFC cell stack.

Another method for forming an integrated SOFC component includes forming a first green cell structure having a first green electrode layer, a green electrolyte layer overlaying the first green electrode layer, and a second green electrode layer overlaying the green electrolyte layer. A second green cell structure is formed having a first green electrode layer, a green electrolyte layer overlaying the first green electrode layer, and a second green electrode layer overlaying the green electrolyte layer. A green ceramic interconnect layer is formed disposed between the first green cell structure and the second green cell structure. The first green cell structure, the green ceramic interconnect layer, and the second green cell structure are hot pressed together to integrally bond the first green cell structure, the green ceramic interconnect layer and the second green cell structure to form an integrated, densified SOFC cell stack.

An integrated SOFC stack includes a first cell having a first cathode layer, a first electrolyte layer overlying the first cathode layer, and a first anode layer overlying the first electrolyte layer. A second cell has a second cathode layer, a second electrolyte layer overlying the second cathode layer, and a second anode overlying the second electrolyte layer. An interconnect layer is between the first cell and the second cell. The interconnect layer is directly fused to either said first cathode layer or first anode layer of said first cell, and the interconnect layer is directly fused to either the second cathode layer or second anode layer of the second cell.

An integrated SOFC stack includes a first cell having a cathode layer, an electrolyte layer connected to the cathode layer, and an anode layer connected to the electrolyte layer. A second cell has a cathode layer, an electrolyte layer connected to the cathode layer, and an anode connected to the electrolyte layer. An interconnect layer is between the first cell and the second cell. The interconnect layer is bonded to the first cell and to the second cell in the absence of encapsulants and bonding agents.

A method for making an integrated SOFC stack includes forming a first cell structure. The first cell structure includes a first electrode layer, a first electrolyte layer overlying the first electrode layer, and a second electrode layer overlying the first electrolyte layer. A ceramic interconnect layer is formed overlying the first cell structure. A second cell structure formed to include a third electrode layer, a second electrolyte layer overlying the third electrode layer, and a fourth electrode layer overlying the second electrolyte layer. The first cell structure, the interconnect layer, and the second cell structure are hot pressed together to integrally bond the first cell structure to the interconnect layer and the second cell structure to the interconnect layer, thereby forming an integrated SOFC cell stack.

Figure 1:
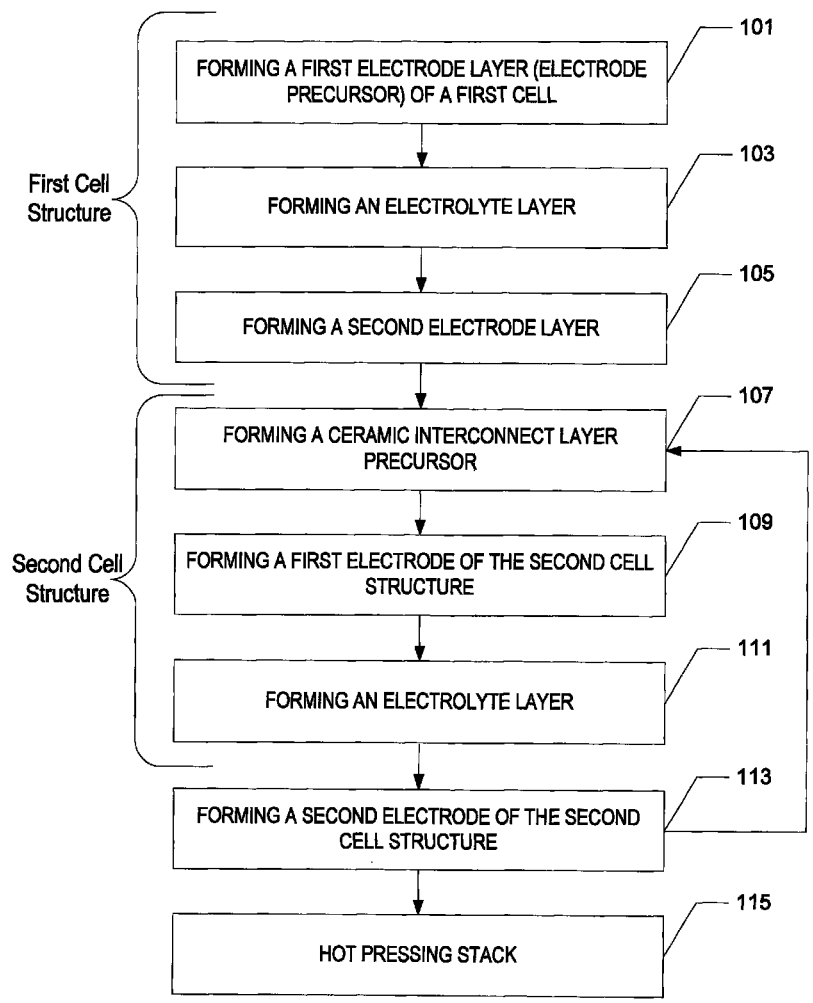
FIG. 1 illustrates a process flow according to an embodiment of the present invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention. All parts and percentages are by volume unless otherwise indicated.

DETAILED DESCRIPTION OF THE INVENTION

According to one embodiment, a method for making a SOFC stack is provided and may be produced according to a process flow illustrated in FIG. 1. An SOFC stack typically includes one or more SOFC cell structures, which generally include a cathode, anode, and interposed electrolyte. At step 101, a first electrode layer (electrode precursor) of a first cell is formed. The first electrode layer may include an anode or a cathode material. According to one embodiment, the first electrode is a cathode formed of a ceramic oxide material or precursor thereof. According to a particular embodiment, the cathode layer material includes lanthanum and manganese, and may further include strontium, forming a cathode commonly referred to as LSM (lanthanum strontium manganate). Alternatively, the first electrode layer may be an anode material, such as a cermet, that is a material having a ceramic phase and a metal phase, or a precursor thereof. The ceramic phase may include zirconia and the metal phase may include nickel. In particular, the ceramic zirconia phase of the anode material is a stabilized zirconia material such as yttria stabilized zirconia (YSZ). The nickel is generally produced through the reduction of nickel oxide included in the anode precursor material, such as a green ceramic composition that is heat-treated.

Additionally, the final-formed electrodes of the SOFC cell structures, either the anode or the cathode, generally have a high volume of porosity to allow transport of gaseous species used to fuel the oxidation/reduction reaction of the fuel cell. According to one embodiment, the percent porosity of the final-formed electrodes in the fuel cell structures is not less than about 15.0 vol %, such as not less than about 20 vol %, about 30 vol %, about 50 vol %, or not less than about 70 vol %. Still, the percent porosity of the electrodes of the cell structures is particularly within a range of between about 15 vol % and 70 vol %.

Generally, the final-formed electrodes (anodes and cathodes) of the SOFC cell structures have a thickness of not less than about 1.0 mm. According to one embodiment, the thickness of the electrodes is greater, such as not less than about 1.5 mm, or not less than about 2.0 mm, or even not less than about 5.0 mm. Still, the thickness of the electrodes is limited and is generally not greater than about 50 mm.

In another embodiment, channels can be formed within the electrodes to facilitate better gas delivery to and removal from the electrodes. There exists a variety of possible materials such that fibers can be used to form the channels or passageways within the cathode and anode layers. Generally, the only limitations on the selection of materials would be that the material would burn or be out-gassed from the fuel cell during the firing process, and that the material is not reactive with the ceramic particles. These two conditions are adequately satisfied by organic based materials. Thus, the fibers can be natural fibers; cotton, bast fibers, cordage fibers, or animal fibers, such as wool, or they may be manufactured fibers; regenerated cellulose, cellulose diacetate, cellulose triacetate, polyamide, polyester, polyacrylic, polyvinyl, polyolefin resins, carbon or graphite fibers, or liquid crystal polymers. Alternatively, the fibers can be extruded lengths of binder material such as synthetic rubber, thermoplastics, or polyvinyl and extruded lengths of plasticizer material such as glycol and phthalate groups. In another embodiment, the material can be pasta, such as spaghetti.

Alternatively, gas channels can be formed into the green electrodes layer without employing any fiber or material to be burned out during sintering. The channels can be formed by pressing, molding, or other suitable means known in the art.

The average size of the channels within the final-formed electrodes is generally greater than about 0.5 mm to reduce pressure drop. In one embodiment, the average size of the channels is greater than about 0.7 mm, such as greater than about 1.0 mm, or even greater than about 2.0 mm. Typically, the average size of the channels within the electrodes is within a range between about 0.5 mm and about 2.0 mm and more particularly within a range between about 0.7 mm and about 1.5 mm.

In further reference to one method for forming an SOFC stack, as illustrated in FIG. 1, forming a first cell structure also includes forming an electrolyte layer precursor, at step 103. Suitable materials for the electrolyte layer of the cell structures include ceramic oxides, such as zirconia, ceria, gallia, and other known ionic conductors. Oxygen ion conductivity may be enhanced with oxide stabilizer materials such as yttrium, scandium, samarium, ytterbium and gadolinium. Suitable stabilizing materials include oxides such as $TiO_2$, $CeO_2$, $CaO$, $Y_2O_3$, $MgO$, $Sc_2O_3$, $In_2O_3$, and $SnO_2$. For example, the electrolyte layer may be formed from yttria-stabilized zirconia, scandia-doped zirconia, ytterbia-doped zirconia, samarium oxide-doped ceria, gadolinium oxide-doped ceria, or calcia-doped ceria, among others.

Forming the first cell structure according to a particular embodiment illustrated in the flow chart of FIG. 1 is completed by forming a second electrode layer, at step 105. Accordingly, the second electrode of the first cell structure involves forming either a cathode or an anode, depending upon which type of electrode was previously formed as the first electrode. As such the first cell structure includes a cathode, an anode and an electrolyte layer disposed between the anode and cathode.

According to FIG. 1, the formation of a SOFC stack further includes forming a ceramic interconnect layer precursor, at step 107. Generally, the ceramic interconnect layer provides an electrical connection between the two adjacent cells and, unlike in parallel SOFC stack formations, the ceramic interconnect layer facilitates series connection of cells. Suitable materials for forming the ceramic interconnect layer may include chromium. Additionally, chromium-containing ceramic materials may further include rare earth elements, such as doped rare earth chromites. According to one embodiment, the ceramic interconnect layer includes materials such as lanthanum, strontium, calcium, cobalt, gallium, yttria, titanate, and magnesium. In one particular embodiment, the species of the interconnect layer can include ceramics such as $LaSrCrO_3$, $LaMgCrO_3$, $LaCaCrO_3$, $YCrO_3$, $LaCrO_3$, $LaCoO_3$, $CaCrO_3$, $CaCoO_3$, $LaNiO_3$, $LaCrO_3$, $CaNiO_3$, and $CaCrO_3$.

Typically, the final-formed ceramic interconnect layer generally has an average thickness of less than about 100 microns. Other embodiments utilize a thinner ceramic interconnect layer, such that it has an average thickness of less than about 50 microns, such as less than about 20 microns, or even less than about 15 microns. Still, the average thickness of the final-formed ceramic interconnect layer is limited, such that it is not less than about 1.0 micron.

In further reference to one method for forming an SOFC stack outlined in the flow chart of FIG. 1, the process continues with the formation of a first electrode of the second cell structure, at step 109, the formation of an electrolyte layer at step 111, and the formation of a second electrode of the second cell structure at step 113. The second cell structure, like the first cell structure, includes an anode, cathode and interposed electrolyte layer. As such, the second cell structure generally has a substantially similar, if not identical, structure and composition as that of the first cell structure. Generally, the cathode, anode, and electrolyte materials are the same as those used in making the component layers of the first cell structure. The formation of multiple cell structures with an interposed ceramic interconnect layer can be repeated, to form 3, 4, 5, 6 or greater cell stacks.

After the formation of a first and second cell structure with an interposed ceramic interconnect layer, the component layers are hot pressed together, as shown in step 115, to form an integrally bonded SOFC stack including the first cell, the ceramic interconnect layer, and the second cell. The integrally bonded SOFC is made into a whole by bringing all layers together and unifying them. Generally, the hot pressing technique involves an applied uniaxial pressure through use of a piston, to aid densification of the component layers. In one embodiment, the maximum pressure during formation of the SOFC stack is not less than about 0.5 MPa, such as not less than about 3.0 MPa, 5.0 MPa, or 8.0 MPa. The peak pressure utilized during hot pressing may vary, such as within a range of about 0.5 to 10.0 MPa, such as 1.0 to 5.0 MPa. Further, an applied temperature during pressing aids in the densification of the layers. The temperature applied during hot pressing is not less than about 1,050° C., such as not less than about 1,000° C., 1,100° C., or 1,200° C. In addition, the temperature applied during hot pressing may not be greater than about 1,800° C., such as not greater than about 1,700° C., or 1,600° C., and as such, the maximum temperature during hot pressing may be within a range of between about 1,100° C. and about 1,700° C. In one embodiment, single cells and multiple cell stacks may be hot pressed at a heating rate of 1° C./min. to 100° C./min. Pressing may be carried out on the order of 10 min. to 2 hours, such as 15 min. to 1 hour. Particular embodiments were hot pressed for 15 to 45 min.

Heat treatment may be performed in a reducing atmosphere or, preferably in a non-reducing atmosphere, such as an oxidizing atmosphere. If heat treatment is performed in a reducing atmosphere, a subsequent oxidation step can be performed. The oxidation step can be used to remove channel formers and pore formers. The oxidation can result in the oxidation of some nickel within the anode or nickel within wire mesh in various electrodes. As such, a subsequent reduction step can be performed. However, hot pressing in an oxidation atmosphere can reduce the number of additional oxidation and reduction steps. Further, the hot pressing can take place without the aid of a restraining die.

The starting ceramic materials for the electrodes (anode and cathode) and electrolytes (electrolyte layer and interconnect layer) can be in powder form having an average diameter of about one micron. Each of the materials for a component of the stack is calcined (partial sintering) isobarically while not under pressure. After calcining, the resulting calcined blocks are crushed by suitable means known in the art, such as ball milling, to form powders. The powders are screened to desired size ranges. For example, the calcined powder, such as LSM, for a cathode base layer can be screened to a mesh size range of greater than about 75 microns but less than about 106 microns. For a cathode functional layer, the calcined powder can be screened to a mesh size range of greater than about 25 microns but less than about 45 microns.

Alternatively, the interlayer forming the cathode functional layer may be formed of a largely unagglomerated powder, having a notably fine particle size. For example, average particle size can lie within a range of about 0.1 µm to about 10 µm. Typically, the average particle size of the relatively fine material is not greater than about 5 µm. A powder having an average particle size within a range of about 0.5 µm to about 5 µm can be particularly suitable.

For the anode base layer and the anode functional layer, the calcined powders, such as YSZ/nickel oxide, can be screened to a mesh size range of less than about 150 microns and about 45 microns, respectively. An electrode having a functional layer and base layer are usually formed of the same material and have a bimodal grain size distribution or a bimodal pore size distribution.

Similarly to the cathode functional layer, the anode functional layer may alternatively be formed of a largely unagglomerated powder, having a notably fine particle size. For example, average particle size can lie within a range of about 0.1 µm to about 10 µm. Typically, the average particle size of the relatively fine material is not greater than about 5 µm. A powder having an average particle size within a range of about 0.5 µm to about 5 µm can be particularly suitable.

Electrode configurations are further described in U.S. Patent Application 60/757,686, filed on Jan. 9, 2006, and U.S. patent application Ser. No. 11/621,447 filed on Jan. 9, 2007, the teachings of which are herein incorporated by referenced.

Additionally, the powders used to form the electrodes can include powders having spherical particles or non-spherical particles, such as elliptical, needle-shaped, or irregularly shaped particles, or a combination of spherical and non-spherical particles. In particular reference to non-spherical particles, such particles typically have a largest dimension, which for the purposes of this discussion will be referred to as the length, and accordingly, the length of such non-spherical particles is the same as the mesh sizes described above.

Generally, the final formed electrodes have a volume density of not greater than about 80%. In particular, the electrodes can have a lesser volume density, such as not greater than about 75%, or not greater than about 70%, or even about 65% or less. Notably, such low densities (high porosities) are achieved without the use of pore formers. The resulting pores are formed in situ during processing and have an average size on the order of average grain size and smaller. Pore shapes are irregular, in contrast to pore former-based pores, which tend to be spherical or otherwise regularly shaped.

The electrolyte and interconnect powders can be screened to a mesh size range of greater than 0.5 microns and less than about 3.0 microns. Generally, the interconnect in final form should have a volume density of about 95% or greater. Depending on the selected materials, the mesh size for a powder may need to be adjusted as needed to achieve the appropriate density. Generally, a fuel cell stack with electrodes is composed of significantly coarser (agglomerated or not) particles as compared to the electrolyte and interconnect components. To reduce densification rate of electrodes, the powders can be agglomerated prior to hot pressing.

Also, in selecting appropriate materials, it has been found that the sintering strain rate should be similar for the electrolyte and interconnect. The sintering strain rate for the anode and cathode should be similar to each other, but the rate can be different than the sintering strain rate for the electrolyte and interconnect. In one embodiment, the sintering strain rate for the anode and cathode are similar to each other, and the sintering strain rate for the electrolyte and interconnect are similar to each other but different than for the anode and cathode.

Successful hot pressing occurs when there is substantially no expansion or contraction in the x-y directions during the hot pressing, as the temperature and pressure are suitably adjusted. This indicates that the layers in the stack are uniformly pressed in a unidirectional manner in the z-direction. The stress development problem between mismatched materials is believed to be solved by forcing all densification in the z-direction (unidirectional). The amount of pressure that is suitable for applying to the stack can be determined by plotting the strain rate as a function of temperature. The resulting plot provides guidance on a suitable pressure profile versus temperature including the temperature at which to apply the maximum pressure. An example of an apparatus for monitoring the pressure, as hot pressing is occurring, is disclosed in E. Aulbach, et al., "Laser-Assisted High-Resolution Loading Dilatometer and Applications," Experimental Mechanics, Vol. 44, No. 1, p. 72 (February 2004), the teachings of which are incorporated herein by reference.

Hot pressing to form an integrally bonded SOFC stack is generally accomplished in one thermal cycle. For the purposes of this disclosure, one thermal cycle describes a temperature cycle in which the process is initiated at an initial temperature and is ended when the processing chamber returns to the initial temperature. Typically, the initial temperature is a low temperature, such as room temperature or a temperature generally less than 75° C., typically less than 50° C., such as room temperature or between about 10-30° C. Alternatively, the initial temperature is below the calcining and sintering temperatures. The application of hot pressing to form an integrally bonded SOFC stack in one thermal cycle produces a free-standing and fully integrated SOFC stack.

According to one embodiment, hot pressing formation of a SOFC stack having cell structures with an interposed ceramic interconnect is facilitated by the pressing of green ceramic materials. Green ceramic materials are generally understood in the art to refer to ceramic materials that have not undergone heat treatment, typically sintering, to effect full densification. As such, hot pressing of the component layers of the cell structures and the interposed ceramic interconnect layer can be undertaken on green ceramic materials, such as green ceramic powders. Full densification, or sintering, of the component layers of the SOFC stack including the ceramic interconnect layer in one thermal cycle of a hot pressing process improves the processing efficiency of SOFC stack formation. According to one embodiment, after processing, the ceramic interconnect layer has a dense structure such that the percent porosity of the ceramic interconnect layer is not greater than about 5.0 vol %. Accordingly, the porosity of the final ceramic interconnect layer may be lower, such as not greater than about 3.0 vol %, 2.0 vol %, or 1.0 vol %. Moreover, after undergoing hot pressing, the thickness of the formed ceramic interconnect layer is generally not greater than about 100 microns thick. According to one embodiment, the thickness of the ceramic interconnect layer is not greater than about 75 microns, such as not greater than about 50 microns, 40 microns, 30 microns, or not greater than 20 microns.

Figure 2:
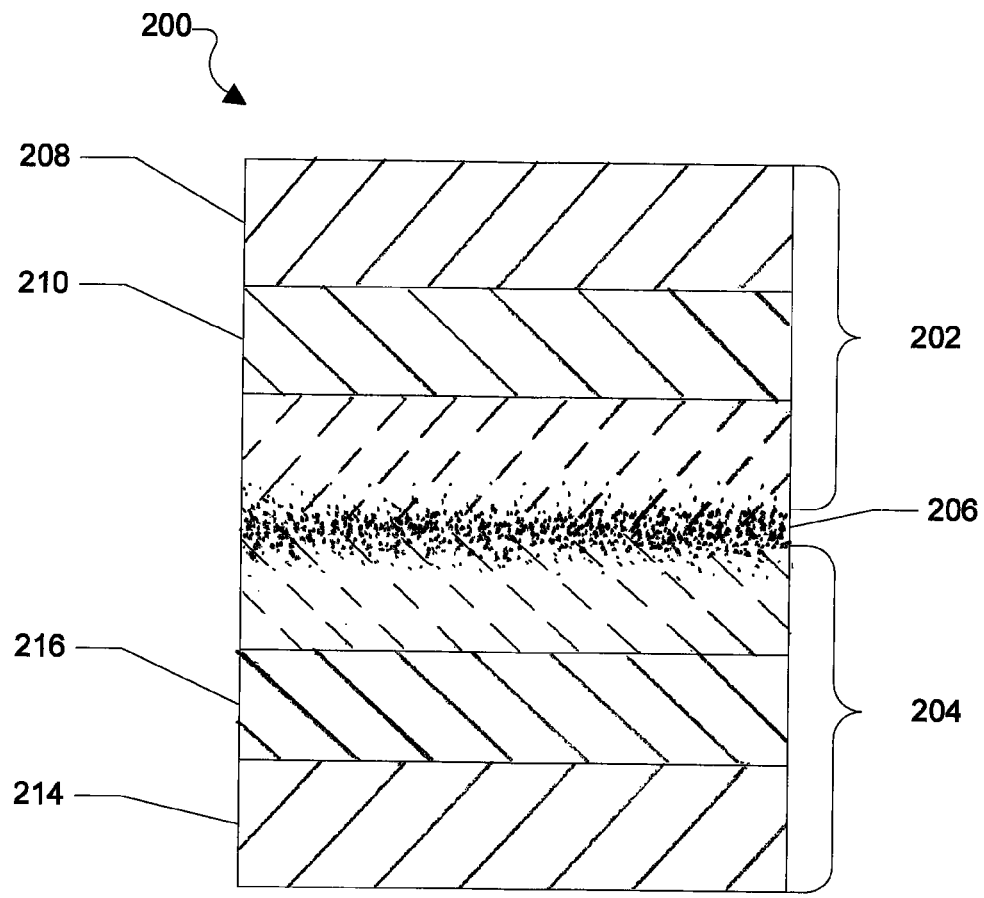
FIG. 2 illustrates a SOFC stack according to an embodiment of the present invention.

Beyond forming a dense ceramic interconnect layer through a single cycle of hot pressing, the combination of pressure and high temperature treatment aids the formation of a high temperature bonding region. Referring to FIG. 2, a particular embodiment of an SOFC stack 200 is illustrated, formed by a hot pressing technique as described above. The SOFC stack 200 having a first cell structure 202, a second cell structure 204, and an interposed ceramic interconnect layer 206 is illustrated. As described in accordance with previous embodiments, the first cell structure 202 includes a first electrode layer 208, electrolyte layer 210, and a second electrode layer 212. The second cell structure 204 includes a first electrode layer 214, an electrolyte layer 216, and a second electrode layer 218. Notably, FIG. 2 illustrates a first high temperature bonding region 220 along the interfacial region of the ceramic interconnect layer 206 and the second electrode layer 212 of the first cell structure 202.

FIG. 2 further illustrates a second high temperature bonding region 222 along the interfacial region of the ceramic interconnect layer 206 and the second electrode layer 222 of the second cell structure 204. The first high temperature bonding region 220 and second high temperature bonding region 222 are generally diffusion bonds in which material species of the two adjacent layers diffuse into each other under the pressure and high temperatures of hot pressing.

Generally, the high temperature bonding regions 220 and 222 which form diffusion regions along the interfacial region of the ceramic interconnect layer 206 have an average thickness of at least about 10 microns. In one embodiment, the diffusion regions have an average thickness of not less than about 25 microns, such as not less than about 50 microns, or not less than about 75 microns, or even not less than about 100 microns. Depending upon the thickness of the ceramic interconnect layer 206, the diffusion regions have an average thickness of not greater than about 300 microns.

It is also pointed out that the layers of the SOFC stacks often have quite varying grain sizes, corresponding to raw material particle sizes. Such differences can be an order of magnitude or even greater. While in conventional pressureless sintering approaches, such structures tend to crack at layer interfaces, hot pressing as described herein, has been formed to overcome issues and produce intact, usable SOFC stacks.

The formation of a high temperature bonding region facilitates the formation of a free-standing SOFC stack with integrally bonded cell structures without use of ceramic glues, encapsulants or bonding agents. Additionally, the formation of an SOFC stack having cell structures integrally bonded via high temperature bonding of a ceramic interconnect layer, may be of particular significance, and results in generation of a diffusion bonded structure that generally does not require encapsulants, solder, or other externally applied bonding agents for structural integrity. That is, diffusion bonds achieved through high temperature/high pressure processing are generally not present in structures relying on low temperature processing that use bonding agents to form structures formed of pre-sintered (i.e., not green) component layers. Moreover, formation of SOFC stacks according to embodiments herein facilitates production of formed stacks having desired contours and dimensions, such as substantially straight edges and walls, requiring little or no post-processing machining.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. An integrated solid oxide fuel cell (SOFC) stack comprising:
    a first cell having a cathode layer, an electrolyte layer overlying the cathode layer, and an anode layer overlying the electrolyte layer;
    a second cell having a cathode layer, an electrolyte layer overlying the cathode layer, and an anode overlying the electrolyte layer, wherein the first cell and the second cell include gas delivery channels formed within the cathode layer or the anode layer; and
    a planar ceramic interconnect layer having a thickness of not less than 1 micron and not greater than 15 microns between the first cell and the second cell, the ceramic interconnect layer having a first high temperature bonding region along an interfacial region between the first cell and the ceramic interconnect layer, and a second high temperature bonding region along an interfacial region between the second cell and the ceramic interconnect layer,
    wherein the first and second high temperature bonding regions include a diffusion bond between the ceramic interconnect layer and the first cell and a diffusion bond between the ceramic interconnect layer and the second cell, and wherein the diffusion bonds have a diffusion region having a thickness not less than 10 microns and not greater than 300 microns.

2. The integrated solid oxide fuel cell (SOFC) stack of claim 1, wherein the ceramic interconnect layer includes a percent porosity of less than 3.0 vol %.

3. The integrated solid oxide fuel cell (SOFC) stack of claim 1, wherein the diffusion bond between the ceramic interconnect layer and the first cell is disposed along the entire interfacial region between the first cell and the ceramic interconnect layer.

4. The integrated solid oxide fuel cell (SOFC) stack of claim 1, wherein the diffusion bond between the ceramic interconnect layer and the second cell is disposed along the entire interfacial region between the second cell and the ceramic interconnect layer.

5. A method for forming an integrated solid oxide fuel cell (SOFC) stack comprising:
    forming a first cell structure, the first cell structure having a first electrode layer, an electrolyte layer overlying the first electrode layer, and a second electrode layer overlying the electrolyte layer;
    forming a ceramic interconnect layer overlying the first cell structure;
    forming a second cell structure, the second cell structure having a first electrode layer, an electrolyte layer overlying the first electrode layer, and a second electrode layer overlying the electrolyte layer; and
    hot pressing the first cell structure, the ceramic interconnect layer, and the second cell structure together during a single hot pressing cycle to integrally bond the first cell structure, the ceramic interconnect layer and the second cell structure to form an integrated SOFC stack,
    wherein the hot pressing is conducted at a temperature not less than 1200° C. and not greater than 1,800° C. and a pressure of not less than 0.5 MPa and not greater than 10 MPa,
    wherein the ceramic interconnect layer of the integrated SOFC stack is planar and has a thickness of not less than 1 micron and not greater than 15 microns,
    wherein the integrated SOFC stack includes a diffusion region along an interfacial region of the ceramic interconnect layer and the first cell structure, the second cell structure, or a combination thereof, and
    wherein the first cell structure and the second cell structure include gas delivery channels formed within the first electrode layer or the second electrode layer.

6. The method of claim 5, wherein hot pressing includes pressing the first cell structure, the ceramic interconnect layer, and the second cell structure together to form an integrally bonded structure in one thermal cycle.

7. The method of claim 5, wherein the ceramic interconnect layer electrically connects the first cell structure and the second cell structure.

8. The method of claim 5, wherein hot pressing includes forming a first high temperature bond region between the ceramic interconnect layer and an adjacent electrode layer in the first cell structure and a second high temperature bond region between the ceramic interconnect layer and an adjacent electrode layer in the second cell structure.

9. The method of claim 8, wherein forming the first and second high temperature bond regions includes forming a diffusion bond region having a thickness not less than 10 microns and not greater than 300 microns.

10. The method of claim 5, wherein the hot pressing is performed without the aid of a restraining die.

11. The method of claim 5, wherein the forming of the first cell structure and the second cell structure is performed without the addition of pore formers.

12. A method for forming an integrated, densified solid oxide fuel cell (SOFC) component comprising:
    forming a first green cell structure having a first green electrode layer, a green electrolyte layer overlaying the first green electrode layer, and a second green electrode layer overlaying the green electrolyte layer;
    forming a second green cell structure having a first green electrode layer, a green electrolyte layer overlaying the first green electrode layer, and a second green electrode layer overlaying the green electrolyte layer;
    forming a green ceramic interconnect layer disposed between the first green cell structure and the second green cell structure; and
    hot pressing the first green cell structure, the green ceramic interconnect layer, and the second green cell structure together during a single hot pressing cycle to integrally bond the first green cell structure, the green ceramic interconnect layer and the second green cell structure to form an integrated, densified SOFC component,
    forming gas delivery channels within a resultant first electrode layer or a resultant second electrode layer of a resultant first or second cell structure of the integrated, densified SOFC component;
    wherein a resultant interconnect layer of the integrated, densified SOFC component is planar and has a thickness of not less than 1 micron and not greater than 15 microns, and wherein the hot pressing is conducted at a temperature not less than 1200° C. and not greater than 1,800° C. and a pressure of not less than 0.5 MPa and not greater than 10 MPa.

* * * * *

UNITED STATES PATENT AND TRADEMARK OFFICE
CERTIFICATE OF CORRECTION

| | | |
|---|---|---|
| PATENT NO. | : 8,771,901 B2 | Page 1 of 1 |
| APPLICATION NO. | : 11/696624 | |
| DATED | : July 8, 2014 | |
| INVENTOR(S) | : Donahue et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1198 days.

Signed and Sealed this
Eighth Day of March, 2016

Michelle K. Lee
*Director of the United States Patent and Trademark Office*